(12) United States Patent
Frame et al.

(10) Patent No.: US 7,035,095 B2
(45) Date of Patent: Apr. 25, 2006

(54) COMPUTER SYSTEM AND CHASSIS

(75) Inventors: Kenneth B. Frame, Spring, TX (US); Gregory C. Franke, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/470,617

(22) Filed: Dec. 2, 2003

(65) Prior Publication Data

US 2005/0002157 A1 Jan. 6, 2005

Related U.S. Application Data

(63) Continuation of application No. 10/244,992, filed on Sep. 17, 2002, now Pat. No. 6,847,523, which is a continuation of application No. 09/634,103, filed on Aug. 8, 2000, now Pat. No. 6,456,486.

(51) Int. Cl.
*G06F 1/16* (2006.01)

(52) U.S. Cl. ............... 361/685; 361/683; 361/684; 361/686; 312/223.1; 312/223.2; 248/73; 248/535

(58) Field of Classification Search ........ 361/683–686, 361/752, 753, 801, 816, 818; 312/222, 223.1, 312/223.2, 348; 174/35 R, 35 GC; 320/107, 320/110, 113, 114; 248/65, 73, 534, 535; 439/53, 154, 157
See application file for complete search history.

(56) References Cited

U.S. PATENT DOCUMENTS

| | | | |
|---|---|---|---|
| 4,853,807 A | | 8/1989 | Trager |
| 5,107,400 A | | 4/1992 | Kobayashi |
| 5,448,446 A | * | 9/1995 | Honda et al. ............... 361/680 |
| 5,457,643 A | * | 10/1995 | Vahey et al. ................ 361/683 |
| 5,495,389 A | * | 2/1996 | Dewitt et al. ............... 361/683 |
| 5,568,362 A | * | 10/1996 | Hansson ..................... 361/736 |
| 5,596,481 A | * | 1/1997 | Liu et al. .................... 361/683 |
| 5,673,174 A | * | 9/1997 | Hamirani .................... 361/686 |
| 5,717,570 A | * | 2/1998 | Kikinis ....................... 361/685 |
| 5,923,537 A | * | 7/1999 | Kuo et al. ................... 361/755 |
| 5,991,838 A | | 11/1999 | Swindler et al. |
| 6,064,568 A | * | 5/2000 | Schmitt ...................... 361/685 |
| 6,115,243 A | * | 9/2000 | Horii .......................... 361/684 |
| 6,144,549 A | | 11/2000 | Moss et al. |
| 6,233,147 B1 | * | 5/2001 | Hunter ....................... 361/690 |
| 6,285,159 B1 | | 9/2001 | Ki et al. |
| 6,374,328 B1 | * | 4/2002 | Rhinehart ................... 711/115 |
| 6,407,910 B1 | * | 6/2002 | Diaz et al. .................. 361/683 |
| 6,480,398 B1 | | 11/2002 | Fiora et al. |
| 6,493,033 B1 | | 12/2002 | Glogan et al. |
| 6,731,500 B1 | * | 5/2004 | Allirot ........................ 361/685 |
| 6,771,492 B1 | * | 8/2004 | DeLuga et al. ............. 361/680 |

FOREIGN PATENT DOCUMENTS

| | | |
|---|---|---|
| EP | 000505938 A | 9/1992 |
| WO | WO 91/18493 | 5/1990 |

* cited by examiner

*Primary Examiner*—Michael Datskovskiy

(57) ABSTRACT

A computer system having electronic components housed in a central unit having a protective enclosure and a cover. The cover is moveable to provide access to electronic components housed in the central unit. The cover allows access to certain electronic components and prevents access to other electronic components.

42 Claims, 10 Drawing Sheets

COMPUTER SYSTEM AND CHASSIS

This application is a continuation of application No. 10/244,992 filed on Sep. 17, 2002, now U.S. Pat. No. 6,847,523, which is a continuation of application No. 09/634,103, filed on Aug. 8, 2000, now U.S. Pat. No. 6,456,486.

FIELD OF THE INVENTION

The present invention relates generally to a computer system, and particularly to a computer system having a chassis providing safe and easy access to serviceable components of the computer system.

BACKGROUND OF THE INVENTION

A typical consumer computer system consists of a variety of electronic components, such as a power supply, a processor, and memory. The power supply supplies electrical power to the electrical components of the computer. A processor controls the operation of the computer and operates according to programming instructions stored in the memory. Typically, the power supply, processor, and memory are housed within an enclosure. A typical computer system also includes additional components, such as a keyboard, mouse, monitor, or printer.

A typical enclosure consists of a base and a cover with the cover being securable to the base. In such an enclosure, the cover must be removed in order to service any of the components within the enclosure. The types of service performed by the typical consumer are usually limited in nature. For example, a consumer might add additional memory to the system. However, a technician is more likely than a consumer to perform repairs to a computer system. Thus, there is little need for a consumer to have ready access to all of the electronic components of a computer system.

Generally, removing the cover to access any of the components within the protective enclosure exposes a large number of electrical components that are subject to damage. In addition, a consumer may be unfamiliar with the internal layout of the computer and, thus, have difficulty finding the location of a specific component. For example, a consumer seeking to add additional memory to a computer may not be able to quickly locate the appropriate connector to receive the memory.

There exists a need for a computer chassis that facilitates interchangeability of components by a consumer and which directs the consumer to those specific components.

SUMMARY OF THE INVENTION

The present invention features a computer system having a central electronics unit and a removable component selectively coupleable to the central electronics unit. The system includes a chassis having a protective enclosure and a movable cover. The protective enclosure forms a barrier to the central electronics unit. When the cover is in a first position, the movable cover forms a barrier to the removable component. When the movable cover is in a second position, an individual may access the removable component.

According to another aspect of the invention, a computer system is featured having a protective chassis, a removable component disposable within the protective chassis, and a plurality of electronic components disposed within the protective chassis. The protective chassis is configured to provide access to the removable component and to form a barrier to access to the plurality of electronic components According to another aspect of the present invention, a method of configuring a computer system is featured. The method includes determining a component of a computer system to be made accessible by a consumer. The method also includes determining what component of a computer system is not to be made accessible by a consumer. The method further includes manufacturing an enclosure for the computer system, and configuring the system so that a component is accessible to a consumer by movement of a cover. However, the method also includes protecting other component(s) from ready access.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
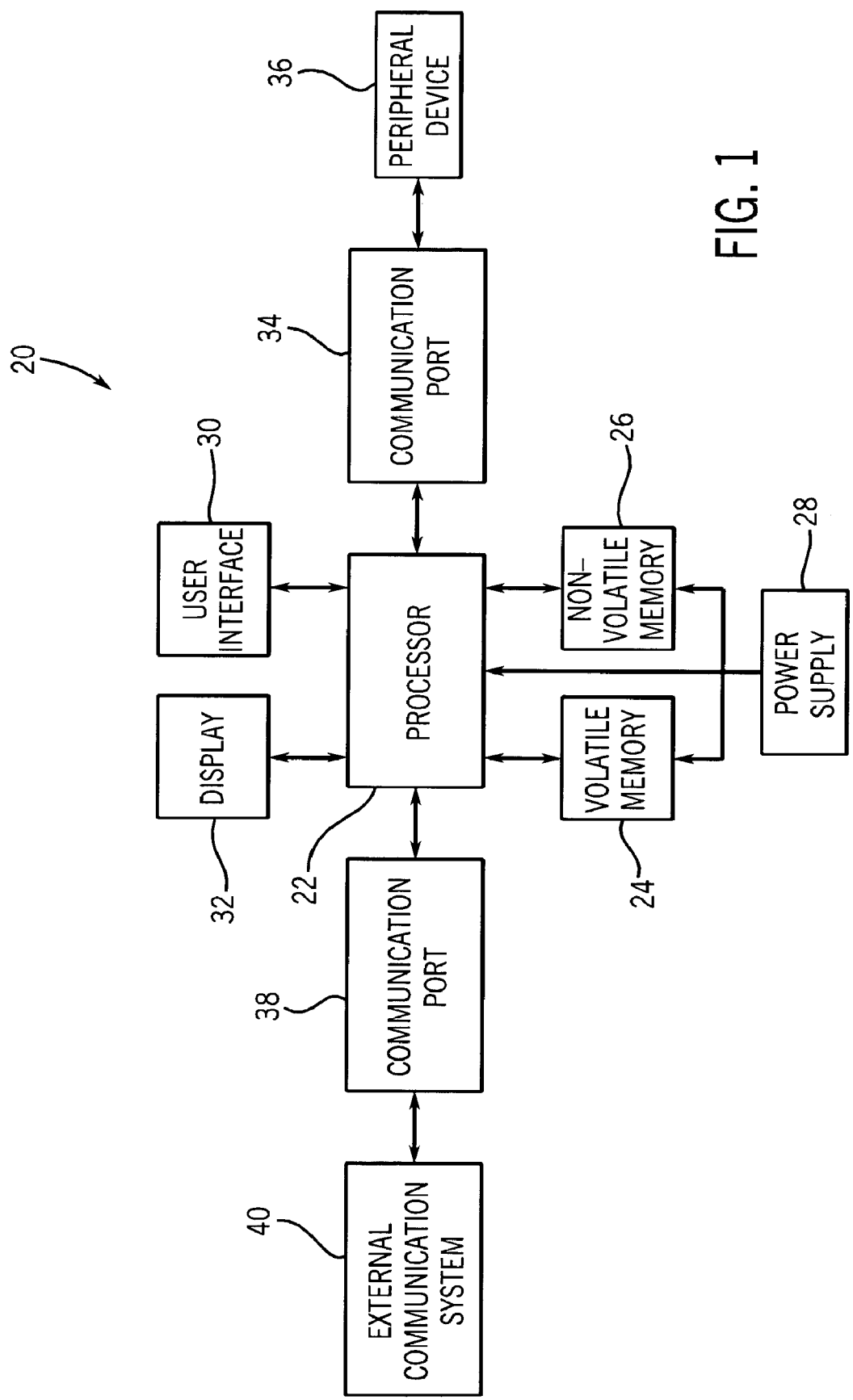
FIG. 1 is a block diagram of a computer system, according to an exemplary embodiment of the present invention.

Referring generally to FIG. 1, a block diagram is illustrated depicting an exemplary computer system, generally designated by the reference numeral 20. Computer system 20 can be any of a variety of different types, such as a server, desktop computer, or notebook computer. In the illustrated embodiment, a processor 22 controls the operation of computer system 20. Processor 22 utilizes computer programming to control the operation of system 20. Electronic memory is coupled to processor 22 to store and facilitate execution of the computer programming.

Processor 22 can be coupled to a volatile memory 24, such as RAM, and a non-volatile memory 26, such as a hard drive. Non-volatile memory 26 can also include a disk drive, tape drive or read only memory (ROM), such as an EPROM, to be used in conjunction with volatile memory 24. A variety of memory modules, such as DIMMs, DRAMs, SDRAMs, SRAMs, etc. can be utilized as volatile memory for a given device or application. The memory in system 20 can be expanded by adding additional memory or can be upgraded by replacing existing memory with improved replacement memory. Computer system 20 also includes a power supply 28 that supplies electrical power to processor 22, volatile memory 24, non-volatile memory 26, and the other electronic components of system 20.

Various components of computer 20 can be coupled to processor 22 depending upon the desired functions of the computer system. Generally, a user interface 30 is coupled to processor 22 to enable a user to direct the operation of system 20. Examples of a user interface 30 include: a keyboard, a joystick, buttons, switches, a light pen, a mouse, and a voice recognition system. A display 32 can also be coupled to processor 22 to provide indications of computer functions. Examples of displays 32 include: a computer monitor, a television screen, LEDs, and even audio speakers.

A communications port 34 can be coupled to processor 22 to enable a peripheral device 36, such as a printer, or a scanner, be coupled to processor 22. Another communications port 38 can be used to couple processor 22 to an external communication system 40, such as a telephone system or network.

Figure 2:
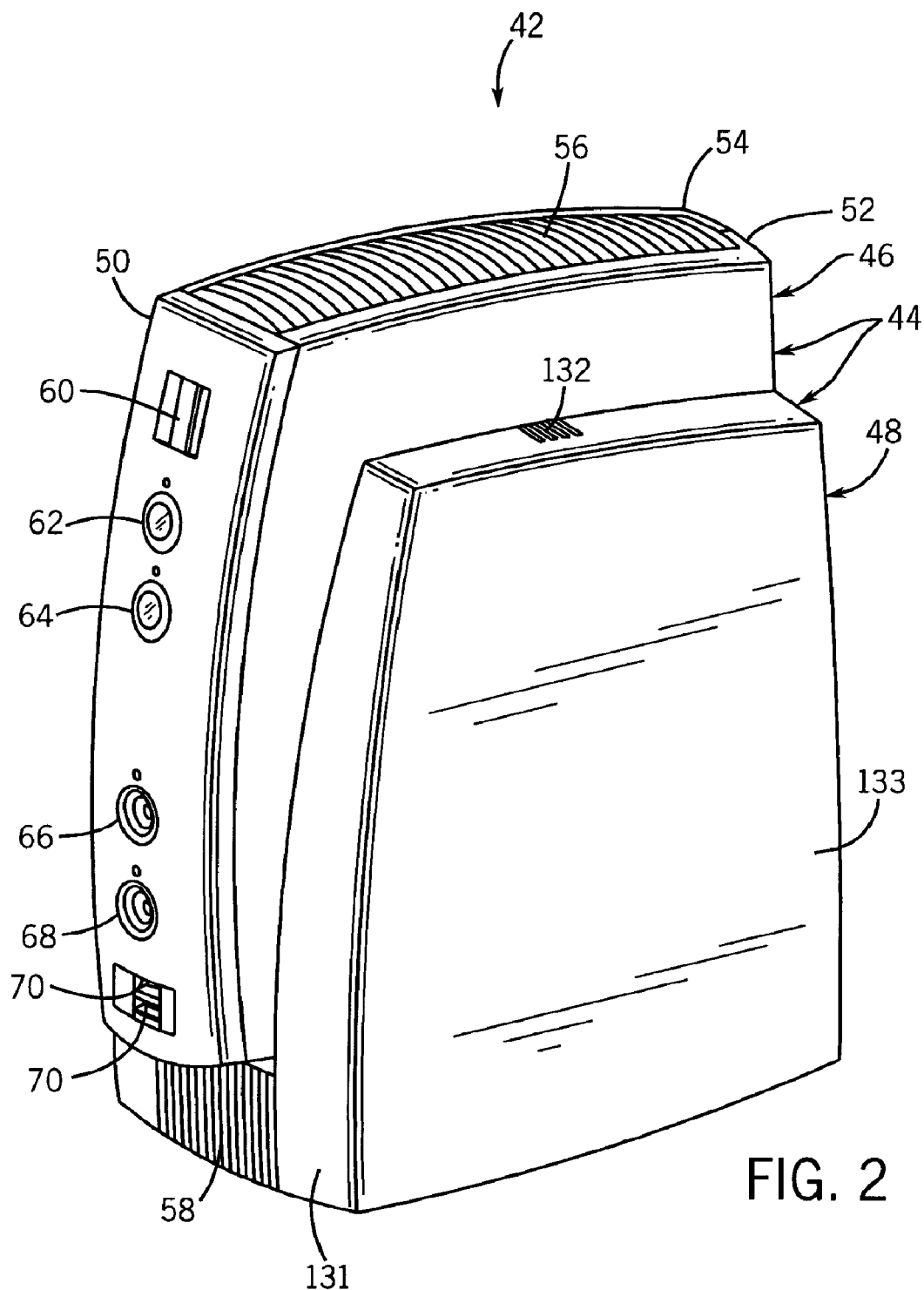
FIG. 2 is a perspective view of the right and front sides of a chassis, according to an exemplary embodiment of the present invention.

Referring generally to FIG. 2, an exemplary embodiment of a central unit 42 of a computer system is featured. A number of the components discussed above in reference to FIG. 1 can be disposed in central unit 42. Central unit 42 includes a chassis 44 that is particularly amenable to providing safe and simple access to customer serviceable components. Additionally, chassis 44 restricts access to other non-customer serviceable components.

Chassis 44 of the illustrated embodiment has an enclosure 46 and a cover 48. Enclosure 46 protects the components disposed therein while providing for ready access to components deemed serviceable by the consumer. A variety of different configurations can be utilized to dispose a consumer serviceable component as part of chassis 44. For example, a consumer serviceable component can be disposed within enclosure 46 and accessible by moving cover 48. Additionally, a consumer serviceable component can be disposed on the exterior of enclosure 46, covered by cover 48, and accessible by moving cover 48. In the illustrated embodiment, cover 48 preferably is formed of plastic but other materials can be used. Other portions of enclosure 46 are formed of metal.

Enclosure 46 is configured to prevent ready access to certain components of central unit 42, e.g., components easily damaged and potential sources of electric shock. These limited access components are thus provided with greater physical protection. In the exemplary embodiment, the limited access components are still accessible for servicing by technicians, or consumers, if desired, but a more traditionally disassembly of components is required to achieve access.

The illustrated embodiment of enclosure 46 includes a front bezel 50, a right bezel 52, and a left bezel 54. Front bezel 50, right bezel 52, and left bezel 54 preferably are formed of plastic. An upper vent 56 and a lower vent 58 allow air to enter and circulate through chassis 44.

A power switch 60 is used to control electrical power to the electronic components within chassis 44. A light 62 is illuminated when electrical power is on. Another light 64 is illuminated when data is transferring to and from the hard drive. The illustrated embodiment of enclosure 46 also includes a microphone jack 66, a headphone jack 68, and two uniform serial bus (USB) ports 70. Chassis 44 can be configured with a variety of other functions and components.

Figure 3:
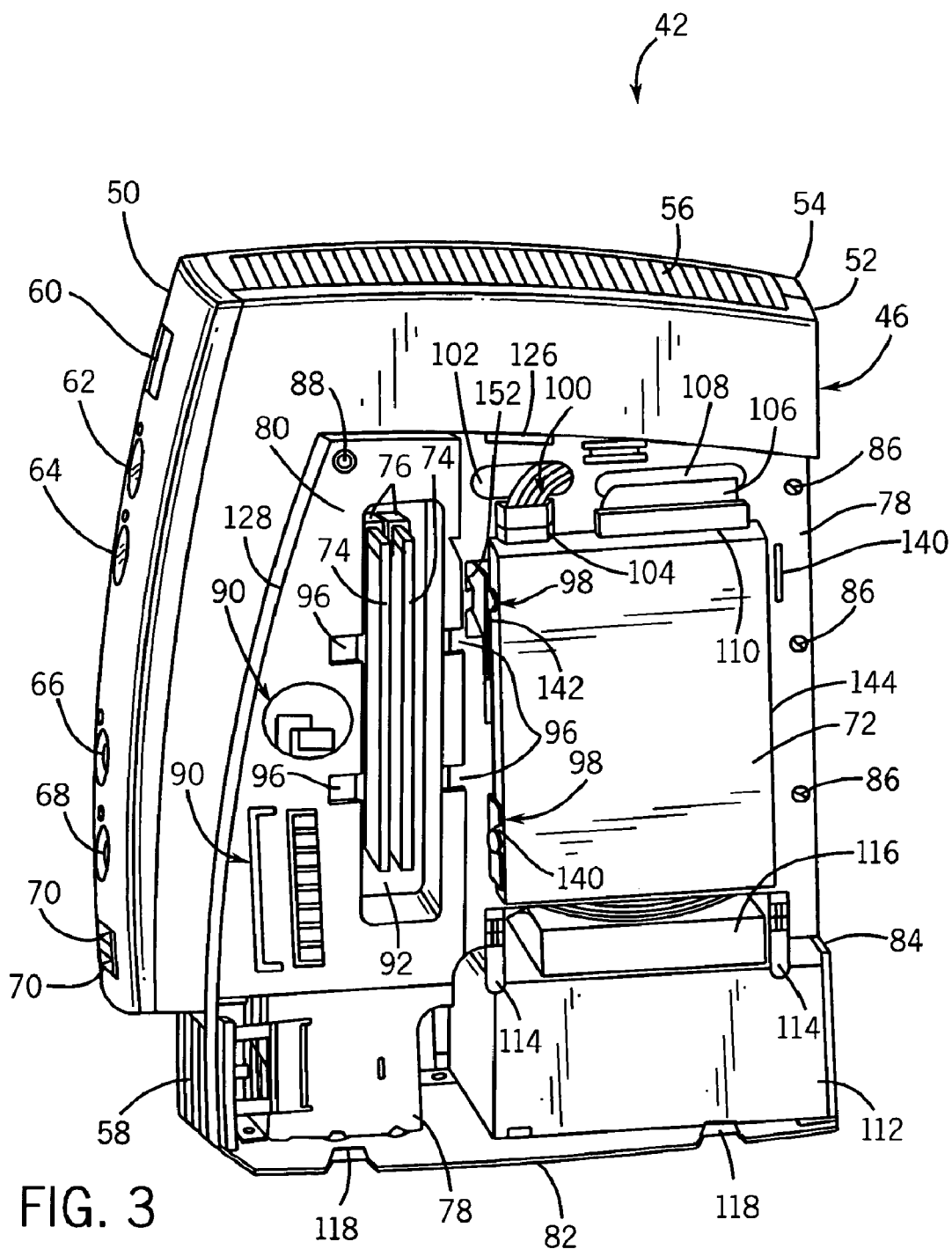
FIG. 3 is a perspective view of the right and front sides of the chassis of FIG. 2, illustrating a cover removed.

Referring generally to FIG. 3, chassis 44 is illustrated with cover 48 removed. In the illustrated embodiment, a hard drive 72 and two memory modules 74 are readily accessible when cover 48 is removed. The selection of specific components to be made readily accessible by displacing cover 48 is a matter of design choice. Thus, additional or alternative components, such as a processor, could be made readily accessible, if desired. Memory modules 74 are secured to connectors 76, Memory modules 74 can be RAM or another form of memory.

In addition to front bezel 50, right bezel 52, and left bezel 54, enclosure 46 also includes a barrier 78, a shroud 80, a base plate 82, and a rear plate 84. Barrier 78, base plate 82, shroud 80, and rear plate 84 can be constructed of a variety of different materials, such as metal or plastic. In the illustrated embodiment, barrier 78, base plate 82, and rear plate 84 are formed of sheet metal and shroud 80 is formed of plastic. Barrier 78 is secured to chassis 44 by a plurality of screws 86. Shroud 80 has a guide hole 88 and two diagrams 90 illustrating the proper technique for inserting and removing a memory module 74 from connector 76.

Figure 4:
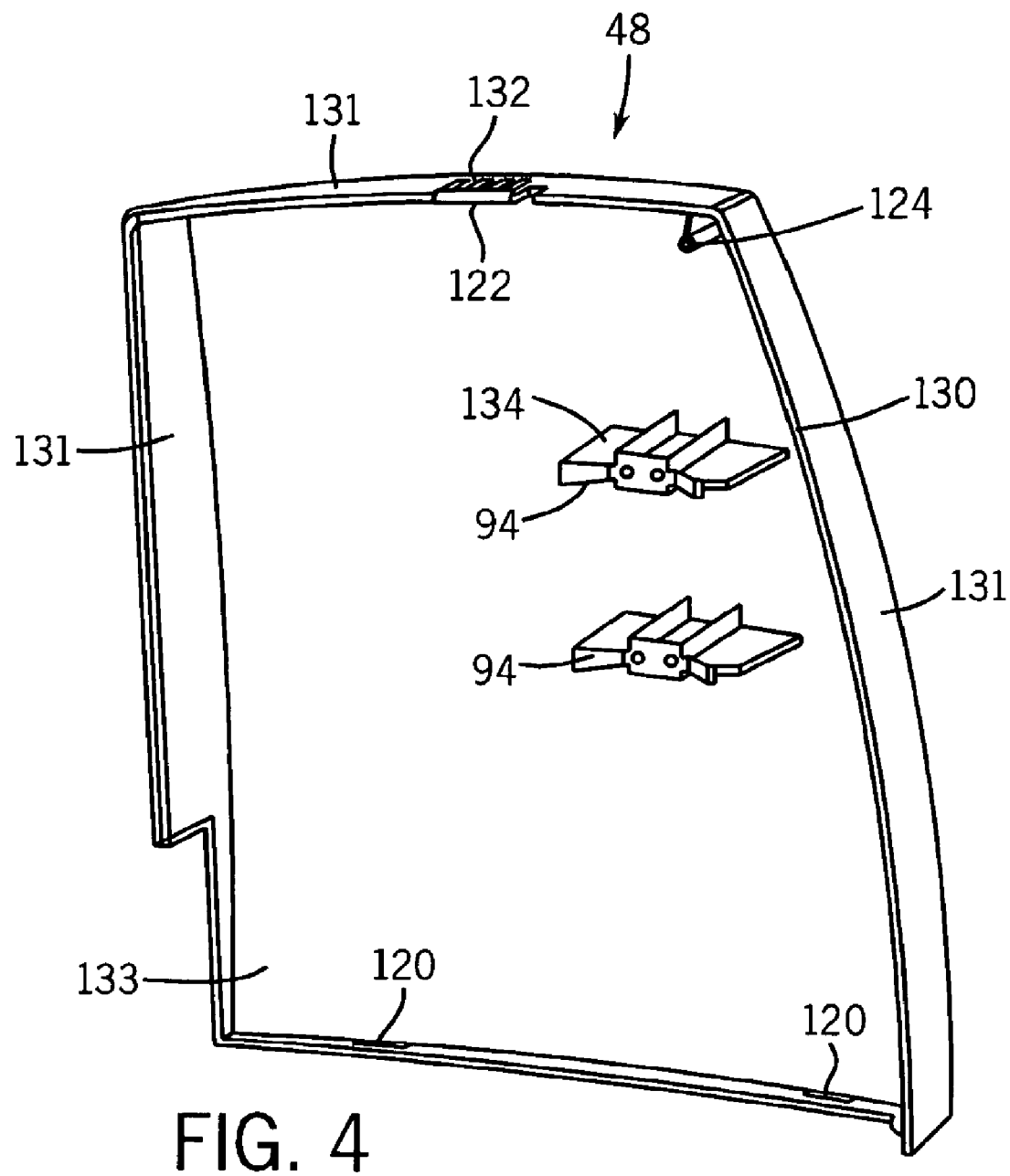
FIG. 4 is a perspective view of the interior of the cover featured in FIG. 2.

Shroud 80 includes an opening 92 that provides access to connectors 76. The components within enclosure 46 are prevented from emitting radio signals through opening 92 by conductive contacts 94 in cover 48, as best illustrated in FIG. 4. When cover 48 is installed on enclosure 46, conductive contacts 94 contact bare metal portions 96 of barrier 78 and form a conductive bridge across opening 92. This serves to reduce the radio emissions through opening 92.

In the illustrated embodiment, a mounting assembly 98 is used to secure hard drive 72 to barrier 78, i.e., the exterior of enclosure 46. Alternatively, hard drive 72 can be disposed within enclosure 46. Electrical power and data are coupled to hard drive 72 by two separate cables. Electrical power to operate the hard drive is supplied by a power cable 100. Power cable 100 passes through a first opening 102 in barrier 78. Power cable 100 connects to a power connector 104 on hard drive 72. A data cable 106 passes through a second opening 108 in barrier 78. Data cable 106 connects to a data connector 110 on hard drive 72. Alternatively, a single cable for transmitting data and power can be used.

A power supply 112 is used to supply electrical power to the electrical components of central unit 42. Ground clips 114 are used to electrically ground barrier 78 to power supply 112. A ventilation fan 116 is disposed directly above power supply 112 to provide a flow of air to cool the electronic components within chassis 44.

Referring generally to FIGS. 3 and 4, cover 48 can be secured and removed from chassis 44 without the use of any tools. To install cover 48, cover 48 is positioned so that two tabs 118 on chassis 44 are inserted into two corresponding openings 120 in cover 48. The tabs restrict the lateral motion of cover 48.

Additionally cover 48 has a latch 122 and a guide pin 124. Enclosure 46 includes a catch 126 that corresponds to latch 122. To secure cover 48, cover 48 is pivoted so that latch 122 engages catch 126. As cover 48 is pivoted against enclosure 46, guide pin 124 is inserted into guide hole 88 of shroud 80. Front bezel 50 and right bezel 52 are shaped to form a recess 128. An edge 130 along two sides 131 of cover 48 is seated in recess 128 of enclosure 46 when cover 48 is secured to enclosure 46.

To release latch 122 from catch 126 and remove cover 48 from enclosure 46, a portion 132 of a sidewall 131 of cover 48 is pressed downward. Cover 48 is then pivoted so that latch 122 and guide pin 124 are brought fully free of catch 126 and guide hole 88, respectively. Cover 48 is then lifted upwards to free cover 48 from tabs 118.

A variety of different configurations can be used to secure cover 48 to enclosure 46. For example, chassis 44 could utilize a hinge mechanism to secure cover 48 to enclosure 46.

Referring again to FIG. 4, an interior view of cover 48 is illustrated. Cover 48 has several sidewalls 131 and a front panel 133. The dimensions of sidewalls 131 and front panel 133 are selected to ensure that the desired components are accessible and yet protected when cover 48 is connected to chassis 44. This view also illustrates standoffs 134 used to position conductive contacts 94 into proper engagement with metal portions 96 of barrier 78.

Figure 5:
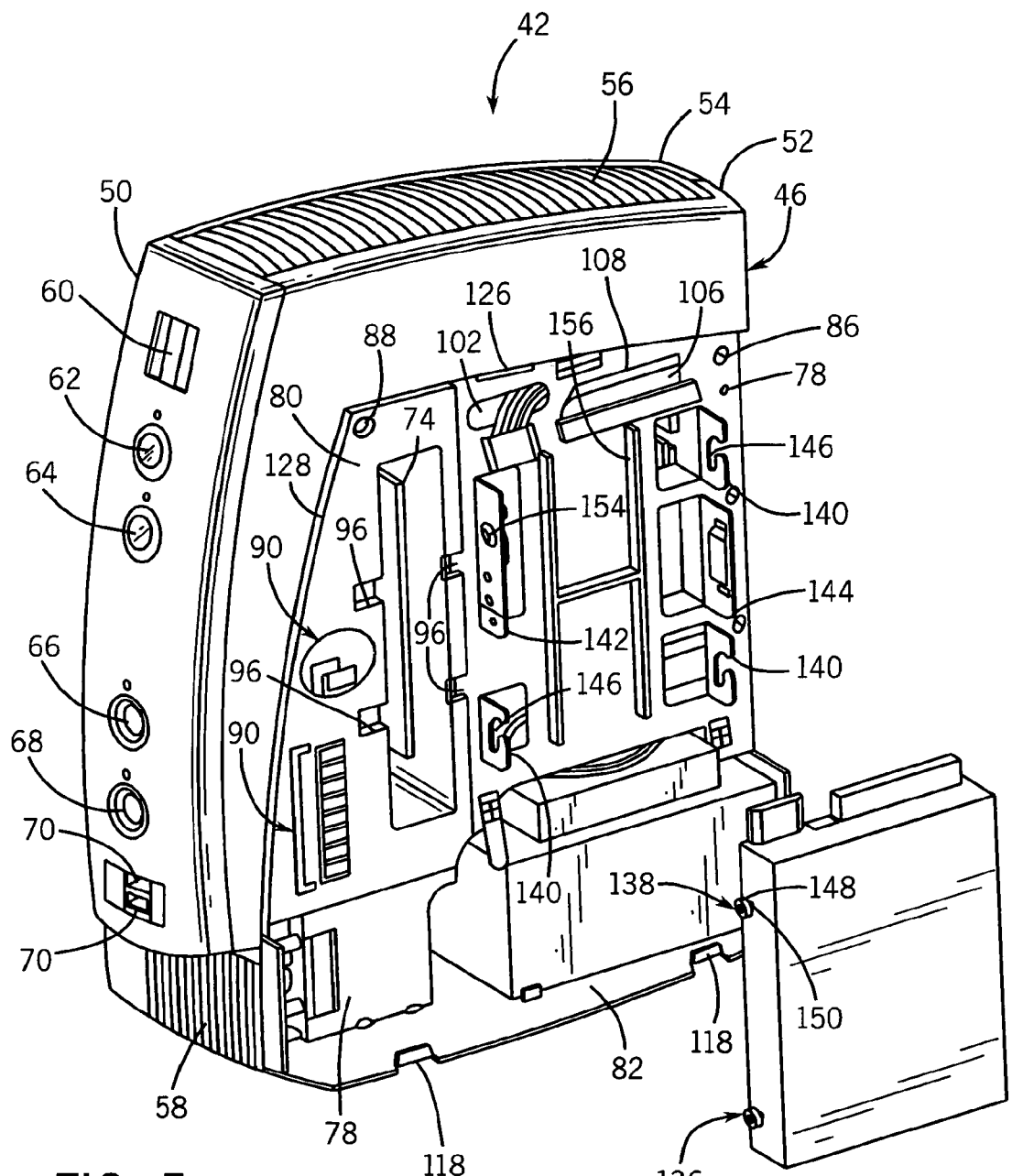
FIG. 5 is a perspective view of the right and front sides of the chassis of FIG. 2, illustrating a cover and a hard drive removed.

Referring generally to FIG. 5, central unit 42 is illustrated with hard drive 72 removed. The illustrated embodiment of hard drive 72 includes three flanged posts 136 and one flanged post 138. Flanged post 136 and flanged post 138 may be identical. Flanged post 138 is the flanged post oriented on the upper left side of hard drive 72 in FIG. 5.

Mounting assembly 98 includes three securing rails 140, a securing rail 142, and a side rail 144. Each of securing rails 140 and securing rail 142 are configured with a guide channel 146 to guide hard drive 72 into and out of mounting assembly 98. Flanged post 136 and flanged post 138 each have a flange portion 148 and a post portion 150.

During installation and removal of hard drive 72, guide channels 146 of securing rails 140 and securing rail 142 direct the post portions 150 of the flanged posts 136 into and out of mounting assembly 98. Flanged portions 148 are positioned outside of each securing rail. Because flanged portions 148 are wider than guide channels 146, securing rails 140 and securing rail 142 prevent lateral movement of hard drive 72. Side rail 144 extends along one side of hard drive 72 and assists in preventing lateral movement of hard drive 72.

A flexible strip 152 is secured to securing rail 142 to prevent removal of hard drive 72 from mounting assembly 98. During installation of hard drive 72 into mounting assembly 98, the flange portion 148 of flanged post 138 produces a temporary displacement of flexible strip 152. When hard drive 72 is fully installed into mounting assembly 98, flanged portion 148 of flanged post 138 reaches a securing hole 154 in flexible strip 152 and is no longer able to displace flexible strip 152. Consequently, flexible strip 152 returns to its normal position. Flexible strip 152 and securing hole 154 surround flanged post 138, forming an obstruction that prevents flanged post 138 and, thus, hard drive 72 from being withdrawn from mounting assembly 98. In the installed position, hard drive 72 is positioned against a raised portion 156 of barrier 78.

To remove hard drive 72 from chassis 44 power cable 100 and data cable 92 are disconnected from power connector 104 and data connector 94, respectively. Flexible strip 152 is flexed in the direction away from hard drive 72 so that flanged portion 148 of flanged post 138 is no longer obstructed by flexible strip 152. Hard drive 72 can then be lifted and guided out of mounting assembly 98.

Figure 6:
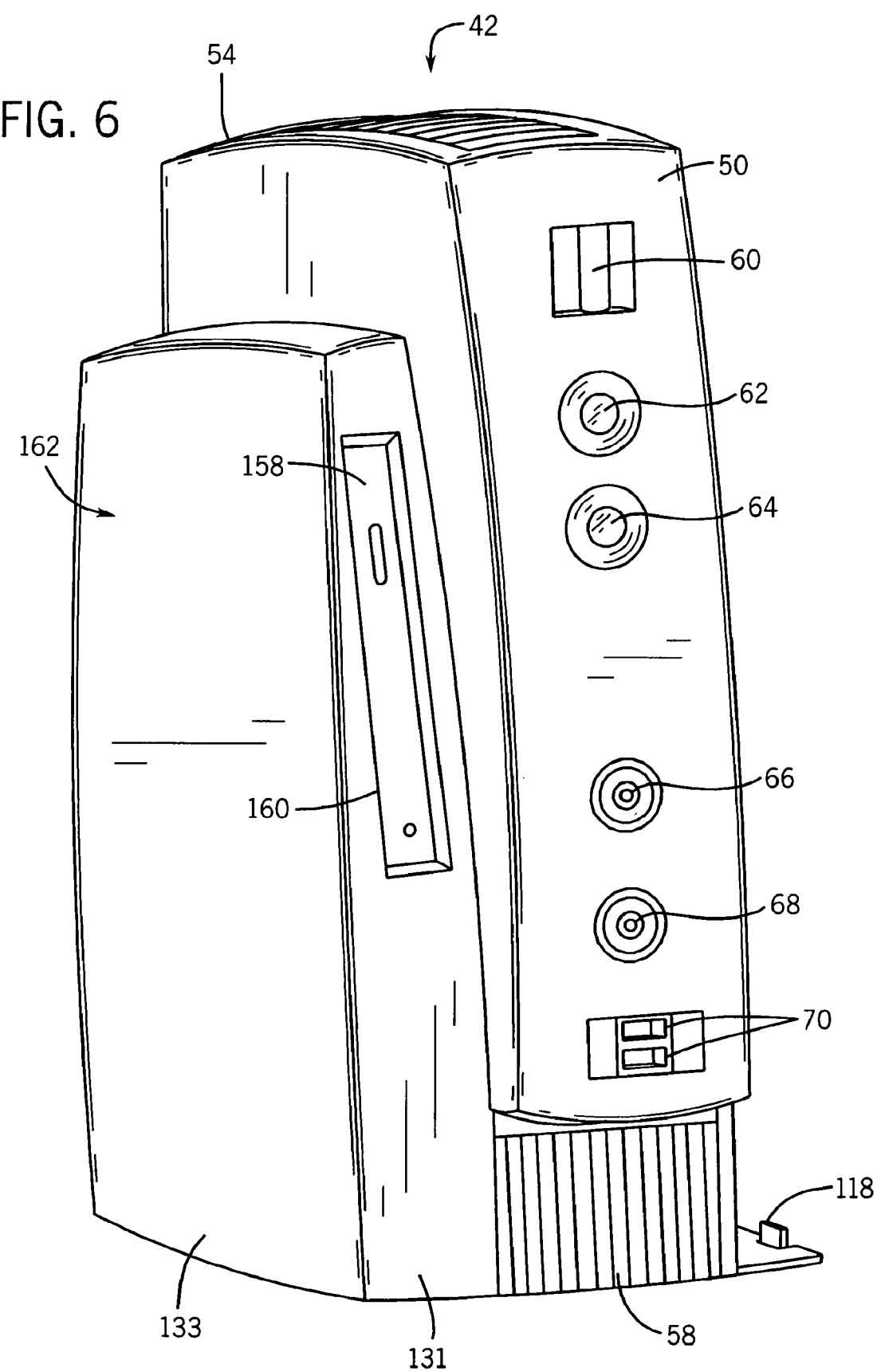
FIG. 6 is a perspective view of the left and front sides of a chassis having a removable device, according to an alternate exemplary embodiment of the present invention.
Figure 7:
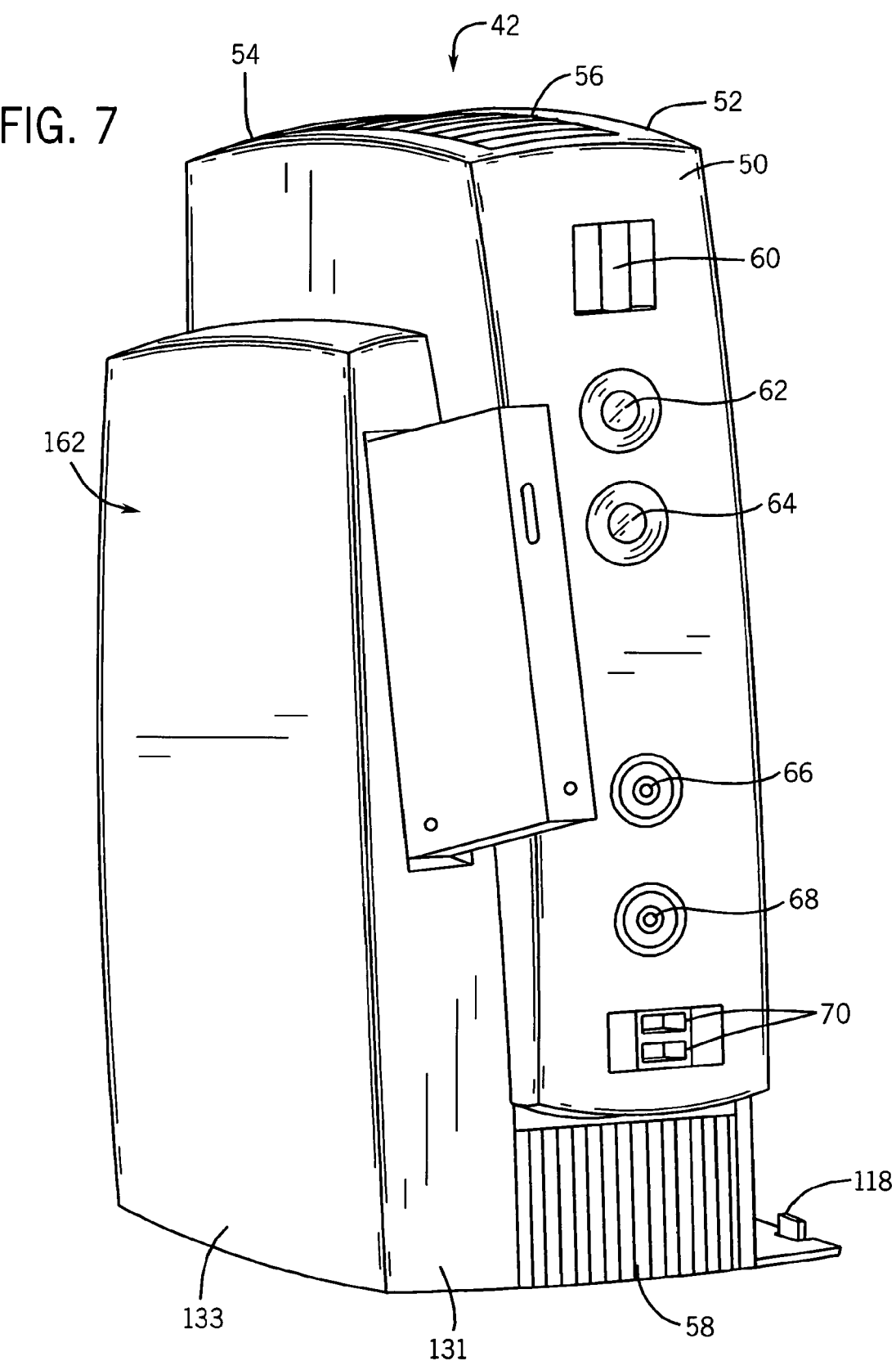
FIG. 7 is a perspective view of the left and front sides of a chassis, illustrating the portability of a removable device.

Referring generally to FIG. 6, an alternative embodiment of the present invention is illustrated that features a removable electronic device 158. Removable device 158 can take many forms. For example, removable device 158 can be a CD-Rom player or recorder, a DVD player, or a memory storage device that is interchangeable between a notebook computer and a desktop computer. As best illustrated in FIG. 7, removable device 158 is installed and removed from central unit 42 through an opening 160 in cover 162. Cover 162 is secured to chassis 44 in the same manner as cover 48. Alternatively, removable device 158 could be disposed in enclosure 46 and accessed without the use of cover 162.

Figure 8:
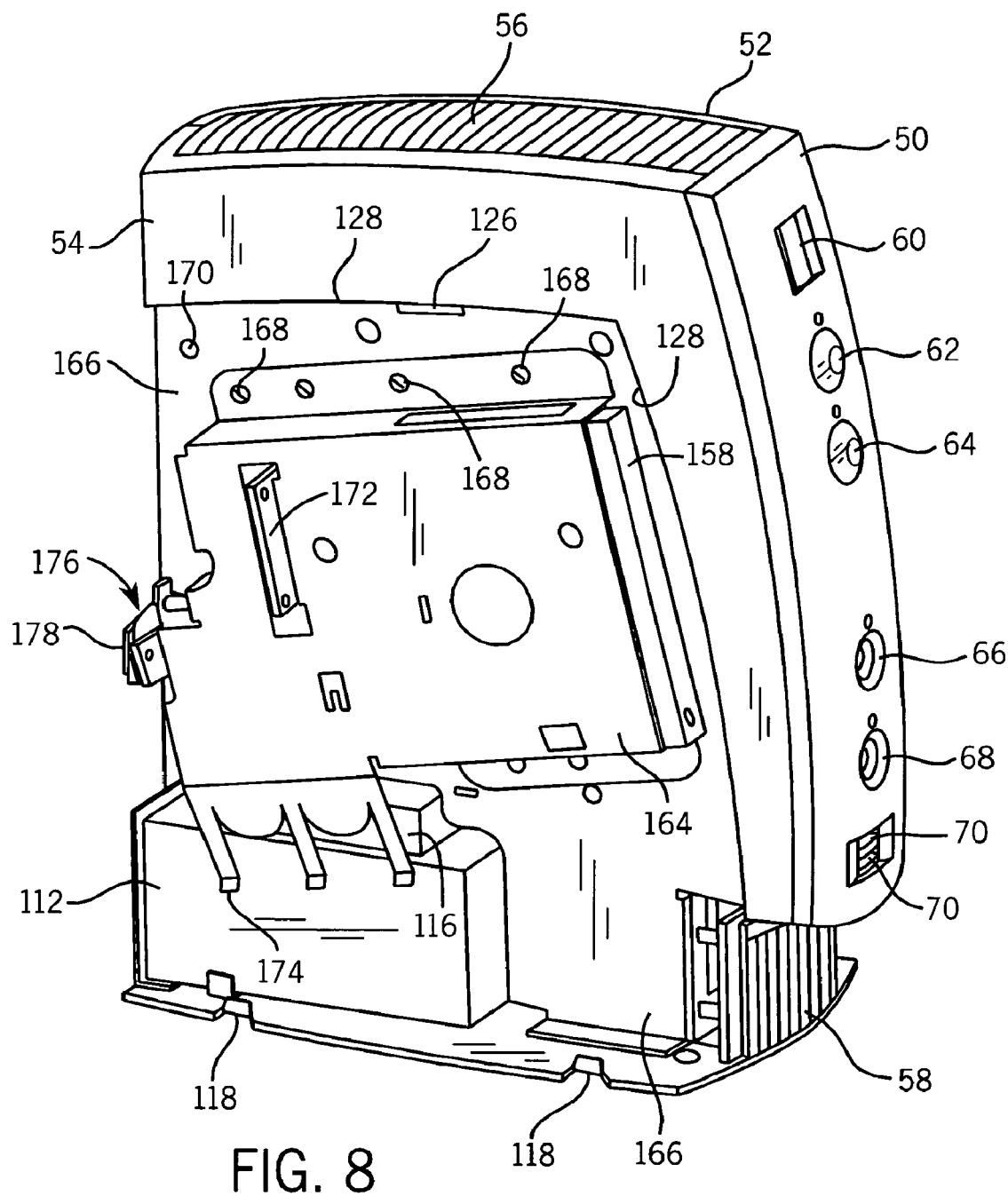
FIG. 8 is a perspective view of the left and front sides of the chassis of FIG. 6, illustrating the chassis with the cover over the removable device removed.

Referring generally to FIG. 8, removable device 158 is designed to be secured in a device bay 164. In the illustrated embodiment, device bay 164 is secured to a barrier 166 on the outside of enclosure 46 by several screws 168. Device bay 164 alternatively can be disposed on the inside of enclosure 46 and accessed by an opening in enclosure 46. Barrier 166, like shroud 80, has a guide hole 170 to align and guide cover 162 onto enclosure 46.

To secure removable device 158 to central unit 42, removable device 158 is fully inserted into device bay 164. When fully inserted, removable device 158 is electrically coupled to a printed circuit board 172. Printed circuit board 172 electrically couples device 158 to other electronic components within enclosure 46. A ground clip 174 electrically grounds device bay 164 to power supply 112.

An eject mechanism 176 is used to selectively eject removable device 158 from device bay 164. As illustrated, eject mechanism 176 includes an eject button 178 to initiate the ejection of removable device 158 from device bay 164.

Figure 9:
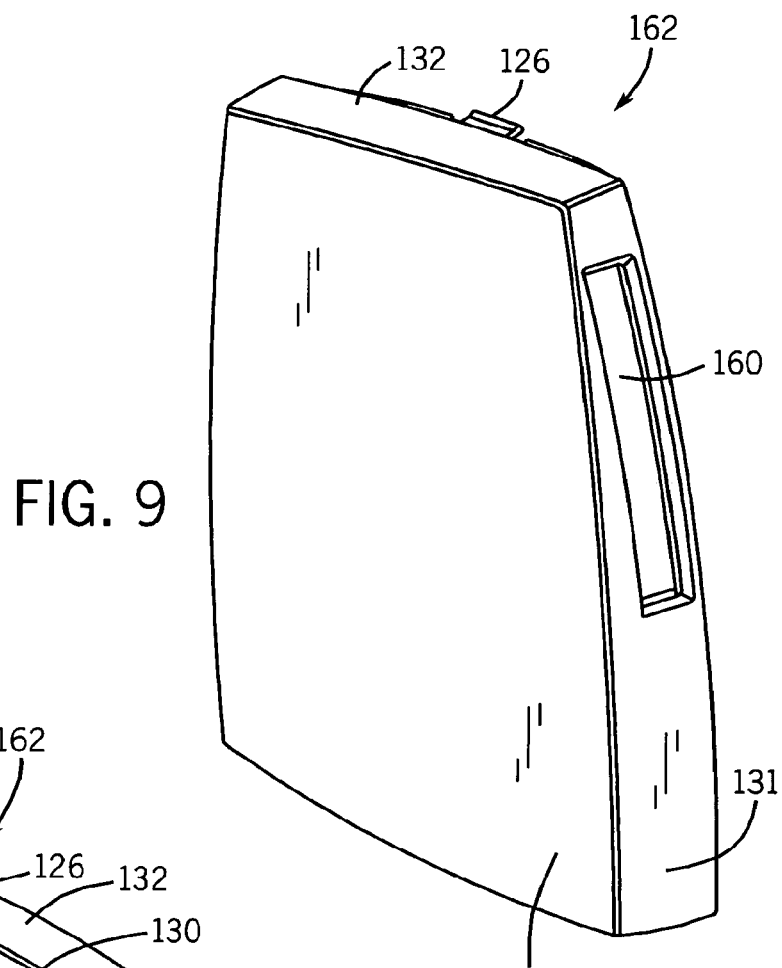
FIG. 9 is a perspective view of the exterior of a cover, according to an alternative embodiment of the present invention.
Figure 10:
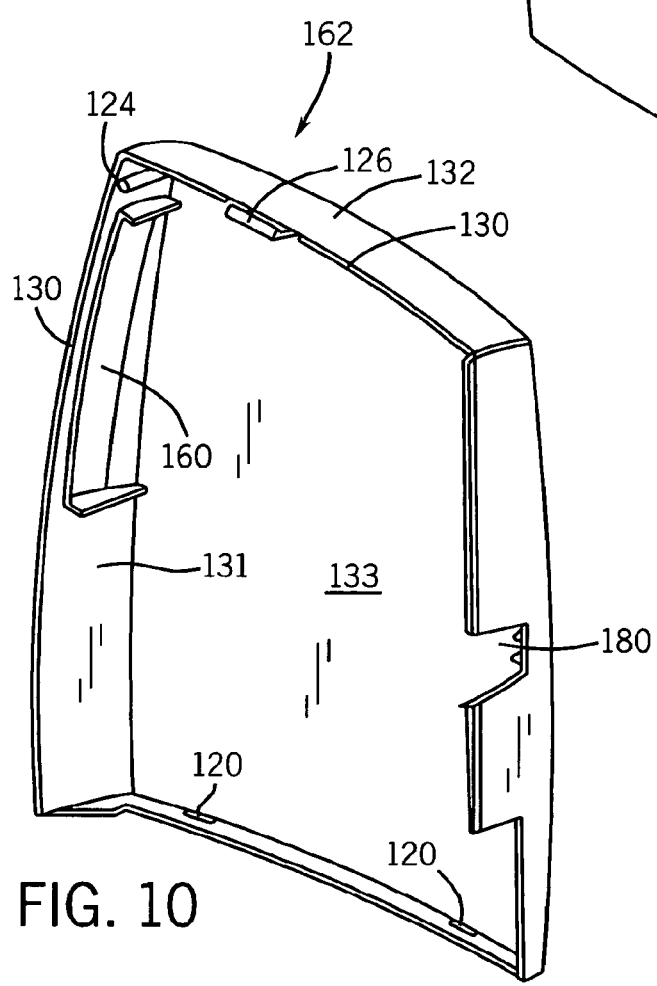
FIG. 10 is a perspective view of the interior of the cover of FIG. 9.

Referring generally to FIGS. 9 and 10, interior and exterior views of cover 162 are illustrated. Cover 162 includes opening 160 for removable device 158. Cover 162 also includes a latch 122 and guide pin 124. A gap 180 in cover 162 is disposed to permit eject button 178 to protrude therethrough.

Figure 11:
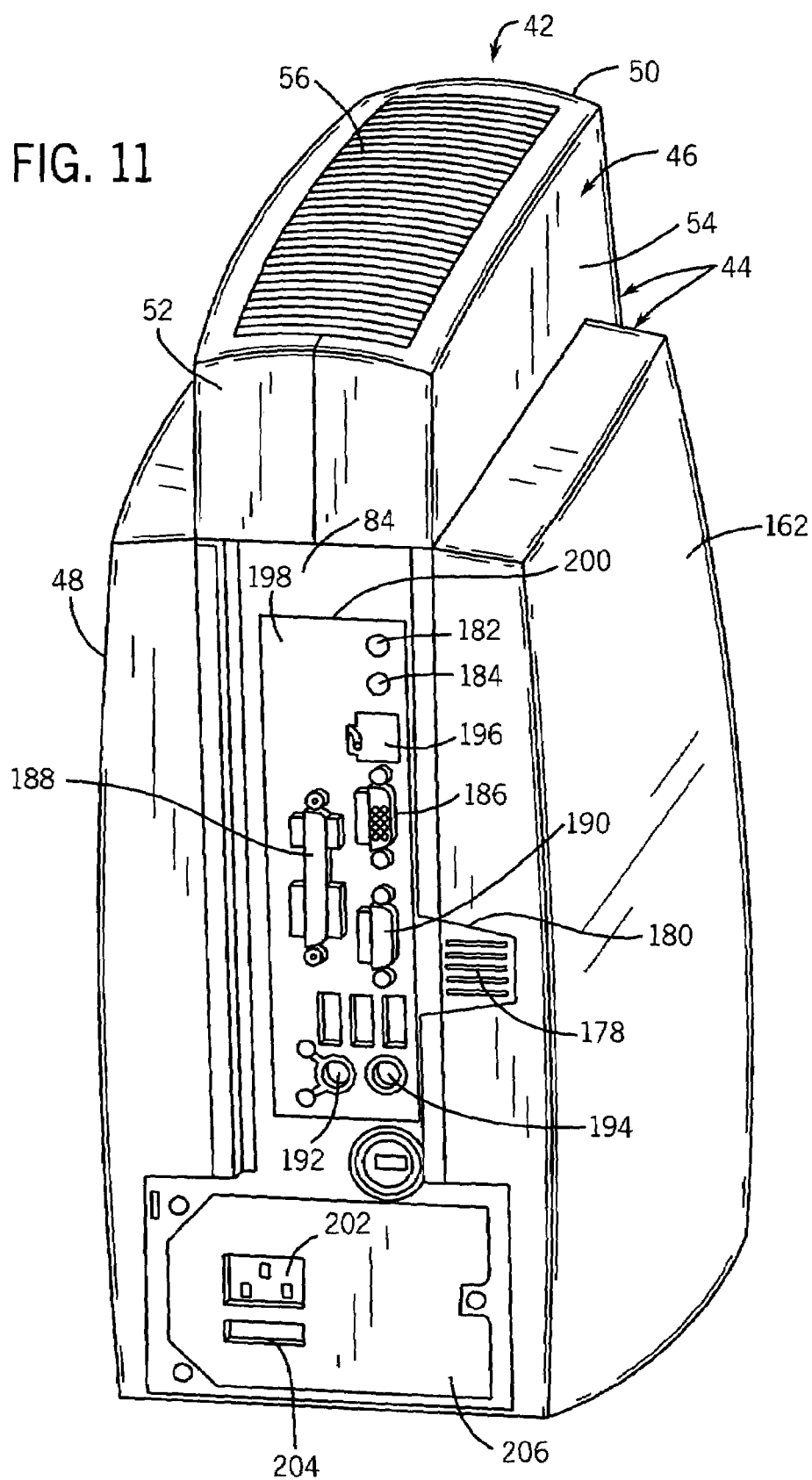
FIG. 11 is a perspective view of the rear of a chassis, according to an embodiment of the present application.

Referring generally to FIG. 11, a plurality of electrical connectors are used to couple central unit 42 to other devices. For example, the illustrated embodiment has an audio input jack 180 and an audio output jack 138. Audio input jack 180 allows an external audio source to be coupled to central unit 42. An audio device, such as a CD player, also can be configured as removable device 158. Audio output jack 184 is used to couple an output from any of these audio devices through central unit 42 to external speakers.

Other devices can also be coupled to central unit 42. A monitor can be coupled to central unit 42 via monitor port 186. A peripheral device, such as a printer, can be coupled to central unit 42 via a parallel port 188. Additional devices can be coupled to central unit 42 by a serial port 190. Central unit 42 also includes a mouse port 192 and a keyboard port 194. An external communications port 196. enables the central unit 42 to be coupled to an external communication system. This port can take many forms, such as a telephone connector, an Ethernet connector, or a coaxial cable connector. These ports are secured to a board 198 that occupies an opening 200 in back plate 84.

Chassis 44 also includes an electrical power connector 202. The illustrated embodiment can operate on either standard 115 VAC or on 230 VAC electrical power. Chassis 44 includes a switch 204 to select between 115 VAC or 230 VAC electrical power. A portion 206 of back plate 84 adjacent to connector 202 and switch 204 has a number of small holes to allow air to be drawn into fan 116.

It will be understood that the foregoing description is of preferred embodiments of this invention, and that the invention is not limited to the specific forms shown. For example, the central unit can be configured so that components other than a hard drive, memory or a removable device are readily removed. Indeed, the system could be configured so that the processor and motherboard may be easily removed. Additionally, a cover may be secured to the chassis in a variety of ways. For example, a cover could be pivotably secured with a hinge. These and other modifications may be made in the design and arrangement of the elements without departing from the scope of the invention as expressed in the appended claims.

What is claimed is:

1. A computer system, comprising:
a processor;
a hard drive selectively coupleable to the processor;
a memory module selectively coupleable to the processor; and
a chassis comprising:
a protective enclosure adapted to house the processor, wherein the protective enclosure forms a barrier to access to the processor; and
a movable cover, wherein in a first position the movable cover prevents access to the hard drive and the memory module and in a second position the movable cover permits access to the hard drive and the memory module.

2. The system as recited in claim 1, wherein the hard drive is disposed on the exterior of the protective enclosure.

3. A computer system, comprising:
a central electronics unit;
a removable memory module selectively coupleable to the central electronics unit;
a removable electronic device selectively coupleable to the central electronics unit; and
a chassis comprising:
a protective enclosure, wherein the protective enclosure forms a barrier to access to the central electronics unit; and
a plurality of movable covers including first and second covers each having first and second positions, wherein the first cover blocks access to the removable memory module in the first position and the first cover enables access to the removable memory module in the second position, and the second cover blocks access to the removable electronic device in the first position and the second cover enables access to the removable electronic device in the second position.

4. The system as recited in claim 3, wherein the removable memory module comprises RAM.

5. The system as recited in claim 2, the system further comprising a plurality of electrical cables having electrical connectors configured for mating engagement with a plurality of electrical connectors on the hard drive, each electrical cable being directed to its respective removable component electrical connector through a separate opening in the enclosure.

6. The system as recited in claim 1, further comprising:
a portable device; and
a portable device bay fixedly secured to the protective enclosure, the portable device bay being configured to electrically couple the portable device to the central electronics unit.

7. The system as recited in claim 6, wherein the portable device is interchangeable between a notebook computer and a desktop computer.

8. The system as recited in claim 6, wherein the portable device is a DVD player.

9. The system as recited in claim 6, wherein the portable device is a CD-ROM player.

10. The system as recited in claim 6, wherein the portable device is a memory storage device.

11. The system as recited in claim 6, wherein the portable device bay is disposed on the exterior of the protective enclosure.

12. The system as recited in claim 1, wherein the movable cover is secured to the system by a mechanism that requires no tools to free the movable cover.

13. The system as recited in claim 1, further comprising a shroud extending into the protective enclosure.

14. A computer system, comprising:
a personal computer comprising:
a protective chassis;
a plurality of removable electronic components disposed within the protective chassis; and
a processor disposed within the protective chassis, wherein the protective chassis is configured to provide access to the plurality of removable electronic components and to form a barrier to access to the processor.

15. The system as recited in claim 14, the chassis comprising:
a protective frame; and
a moveable cover covering a portion of the protective frame.

16. The system as recited in claim 15, wherein the plurality of removable electronic components comprises a memory module, accessible by moving the movable cover.

17. The system as recited in claim 14, further comprising a device bay, wherein the plurality of removable electronic components comprises a portable device disposable in the device bay.

18. The system as recited in claim 17, wherein the portable device is a disc drive.

19. The system as recited in claim 17, wherein the portable device is a DVD player.

20. The system as recited in claim 17, wherein the portable device is a CD-ROM.

21. The system as recited in claim 15, wherein the cover is movable without the use of a tool.

22. The system as recited in claim 15, the chassis further comprising: a shroud forming a barrier between the plurality of removable electronic components and a plurality of standard electronic components.

23. A system, comprising:
a personal computer comprising:
an enclosure;
a cover removably coupled to the enclosure;
a first electronic component disposed inside the enclosure; and
a second and a third electronic component disposed in a region between the exterior of the enclosure and the cover.

24. The system as recited in claim 23, wherein the first electronic component is a consumer serviceable component that is accessible by moving the cover.

25. The system as recited in claim 23, wherein the second and third electronic components are consumer serviceable components that are accessible by moving the cover.

26. The system as recited in claim 23, wherein the first electronic component is a non-customer-serviceable component that is inaccessible by moving the cover.

27. The system as recited in claim 23, wherein the cover is tool-lessly coupled to the enclosure.

28. A system, comprising:
a processor;
an optical drive coupled to the processor; and
a chassis comprising:
a protective enclosure housing the processor;

a first moveable cover selectively coupleable to the protective enclosure, wherein in a first position the first moveable cover prevents access to the optical drive and in a second position the first moveable cover enables access to the optical drive; and wherein the optical drive is disposed on the exterior of the protective enclosure.

29. The system as recited in claim 28, comprising a second moveable cover selectively coupleable to the protective enclosure.

30. The system as recited in claim 29, comprising a removable electronic component disposed between the protective enclosure and the second moveable cover.

31. The system as recited in claim 28, comprising a removable memory module disposed between the protective enclosure and the first moveable cover.

32. A computer system, comprising:
a chassis;
a central electronics unit disposed within the chassis;
a moveable cover selectively coupled to the chassis; and
a plurality of different types of storage media selectively coupled to the central electronics unit and disposed in a space between an exterior of the chassis and an interior of the moveable cover.

33. The computer system of claim 32, wherein the plurality of different types of storage media are coupled to the exterior of the chassis.

34. The computer system of claim 32, wherein the moveable cover is coupled to the chassis by a mechanism that is releasable without tools.

35. The computer system of claim 32, wherein the moveable cover is removable from the chassis.

36. The system as recited in claim 14, wherein the plurality of removable electronic components comprises one or more computer drives.

37. The system as recited in claim 14, wherein the protective chassis comprises a moveable cover disposed over an exterior, and the plurality of removable electronic components comprises one or more personal computer components disposed between the exterior and the movable cover.

38. The system as recited in claim 23, wherein the second and third electronic components are different types of memory devices.

39. The system of claim 23, wherein the second and third electronic components are removable and disposed exterior to the enclosure below the cover.

40. A computer system, comprising:
a personal computer comprising:
a protective chassis, comprising:
a protective frame; and
a moveable cover covering a portion of the protective frame;
a plurality of removable electronic components disposed within the protective chassis;
a hard drive securable to the exterior of the protective frame and coverable by the moveable cover; and
a processor disposed within the protective chassis, wherein the protective chassis is configured to provide access to the plurality of removable electronic components and to form a barrier to access to the processor.

41. A computer system, comprising:
a chassis;
a central electronics unit disposed within the chassis;
a moveable cover selectively coupled to the chassis;
another moveable cover disposed on a side of the chassis opposite from the moveable cover; and
a plurality of different types of storage media selectively coupled to the central electronics unit and disposed in a space between an exterior of the chassis and an interior of the moveable cover.

42. A computer system, comprising:
a chassis;
a central electronics unit disposed within the chassis;
a moveable cover selectively coupled to the chassis; and
a plurality of different types of storage media selectively coupled to the central electronics unit and disposed in a space between an exterior of the chassis and an interior of the moveable cover, wherein the space includes a recess in the exterior of the chassis, the recess having at least one of the plurality of different types of storage media.

* * * * *